(12) United States Patent  
Chidester et al.

(10) Patent No.: US 8,793,459 B2
(45) Date of Patent: Jul. 29, 2014

(54) IMPLEMENTING FEEDBACK DIRECTED NUMA MITIGATION TUNING

(75) Inventors: Kevin L. Chidester, Mantorville, MN (US); Jay P. Kurtz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 13/285,302

(22) Filed: Oct. 31, 2011

(65) Prior Publication Data

US 2013/0111177 A1 May 2, 2013

(51) Int. Cl.
*G06F 12/00* (2006.01)

(52) U.S. Cl.
USPC ............... 711/165; 711/170; 711/E12.002

(58) Field of Classification Search
None
See application file for complete search history.

(56) References Cited

U.S. PATENT DOCUMENTS

| | | | |
|---|---|---|---|
| 4,849,879 A * | 7/1989 | Chinnaswamy et al. | 706/916 |
| 5,269,013 A * | 12/1993 | Abramson et al. | 711/170 |
| 6,105,053 A * | 8/2000 | Kimmel et al. | 718/102 |
| 6,457,107 B1 * | 9/2002 | Wynn et al. | 711/152 |
| 6,839,739 B2 | 1/2005 | Wilson | |
| 7,085,890 B2 * | 8/2006 | Kashyap | 711/130 |
| 7,577,770 B2 | 8/2009 | Tanaka et al. | |
| 7,587,572 B1 * | 9/2009 | Stenstrom | 711/173 |
| 2004/0088498 A1 * | 5/2004 | Accapadi et al. | 711/147 |
| 2005/0257010 A1 | 11/2005 | Jones et al. | |
| 2006/0143350 A1 * | 6/2006 | Miloushev et al. | 710/242 |
| 2007/0043531 A1 * | 2/2007 | Kosche et al. | 702/182 |
| 2007/0118712 A1 * | 5/2007 | van Riel et al. | 711/170 |
| 2007/0239936 A1 * | 10/2007 | Gluhovsky | 711/118 |
| 2007/0288783 A1 * | 12/2007 | Ogasawara et al. | 713/323 |
| 2009/0313445 A1 * | 12/2009 | Pandey et al. | 711/162 |
| 2010/0077128 A1 * | 3/2010 | Stansell et al. | 711/6 |
| 2010/0211756 A1 | 8/2010 | Kaminski et al. | |
| 2010/0250868 A1 | 9/2010 | Oshins | |
| 2011/0138369 A1 * | 6/2011 | Chandra et al. | 717/133 |
| 2011/0289482 A1 * | 11/2011 | Bentley | 717/125 |
| 2012/0072621 A1 * | 3/2012 | Droux et al. | 710/33 |

OTHER PUBLICATIONS

Dimitrios S. Nikolopoulos et al., "User-Level Dynamic Page Migration for Multiprogrammed Shared-Memory Multiprocessors" Proc 2000 Intl Conf on Parallel Processing, Aug. 21, 2000, pp. 95-103.

* cited by examiner

*Primary Examiner* — Matthew Bradley
*Assistant Examiner* — Daniel Bernard
(74) *Attorney, Agent, or Firm* — Joan Pennington

(57) ABSTRACT

A method, system and computer program product are provided for implementing feedback directed Non-Uniform Memory Access (NUMA) mitigation tuning in a computer system. During a page frame memory allocation for a process, predefined monitored performance metrics are compared with stored threshold values. Responsive to the compared values, selected use of local memory is dynamically modified during the page frame memory allocation.

19 Claims, 6 Drawing Sheets

IMPLEMENTING FEEDBACK DIRECTED NUMA MITIGATION TUNING

FIELD OF THE INVENTION

The present invention relates generally to the data processing field, and more particularly, relates to a method, system and computer program product for implementing feedback directed Non-Uniform Memory Access (NUMA) mitigation tuning in a computer system.

DESCRIPTION OF THE RELATED ART

Some large multi-processor computer systems rely on Non-Uniform Memory Access (NUMA) with multiple main memories distributed across the computer system and physically grouped with sets of multiple microprocessors or central processor units (CPUs) and caches into physical subsystem nodes. Memory access is non-uniform with the access time for data stored in local memory in a particular node being significantly less than for data stored in remote memory, such as main memory in another node or I/O resource.

Operating system (OS) kernels have evolved to reduce NUMA effects as servers designs have expanded horizontally. Significant problems these designs address include high latencies needed to access memory which is remote to an executing central processing unit (CPU).

For example, a fetch or store of a memory location which is not in memory local to the executing CPU might take 10s to 100s or more of times more cycles to complete. Therefore, as memory for a process is being allocated, the kernels favor memory which is local to an executing CPU. This decreases latency, decreases memory fabric traffic and contention and can make significant performance differences as compared to random allocations of memory locations.

The natural way for the kernels to implement the decreased latency is to know which memory is local to a CPU or process and which is remote. If a process requires a new memory page, such as for a disk read, or for a content-ignorant allocation not involving a disk read (usually zeroed), the kernel will allocate from the local memory.

The side effect of this is that now the overall partition's total memory is not available to any given CPU/process. For example, if a particular partition includes 4 CPUs, or CPU nodes, and 4 GB of memory, it might be allocated such that each CPU node has 1 GB of local memory. This is not a problem, per se, if end users are aware of this design, and have the ability to configure CPU and local memories such that the end users have complete control and understanding of how memory is allocated.

However, there are kernel and OS designs that hide or automate the local and remote memory management. In the above example, the end user might think a process has 4 GB of memory available to it for allocations.

One existing way around this, is to have a switch that disables favoring local memory. Such a switch could be used during periods in which single-threaded applications or system functions would benefit from using the entire partition's memory.

A need exists for an effective mechanism for implementing Non-Uniform Memory Access (NUMA) mitigation tuning in a computer system.

SUMMARY OF THE INVENTION

Principal aspects of the present invention are to provide a method, system and computer program product for implementing feedback directed Non-Uniform Memory Access (NUMA) mitigation tuning in a computer system. Other important aspects of the present invention are to provide such method, system and computer program product substantially without negative effects and that overcome many of the disadvantages of prior art arrangements.

In brief, a method, system and computer program product are provided for implementing feedback directed Non-Uniform Memory Access (NUMA) mitigation tuning in a computer system. During a page frame memory allocation for a process, predefined monitored performance metrics are compared with stored threshold values. Responsive to the compared values, selected use of local memory is dynamically modified during the page frame memory allocation.

In accordance with features of the invention, the predefined performance metrics include monitored partition wide performance metrics or monitored per process performance metrics. The predefined performance metrics include, for example, cycles per instruction (CPI) monitored over a moving time window and page fault rate monitored over a moving time window. The CPI threshold value and the page fault rate threshold value include system administrator or user selected values.

In accordance with features of the invention, background daemons are provided on a partition wide or per process basis for monitoring the predefined performance metrics. Background daemons track cycles per instruction (CPI) monitored over a moving time window and track page fault rate monitored over a moving time window.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and computer program product are provided for implementing feedback directed Non-Uniform Memory Access (NUMA) mitigation tuning in a computer system.

In accordance with features of the invention, the method, system and computer program product provides enhanced performance when a NUMA system is running in use or favor local memory mode, but the memory requirements for a given process are greater than the local memory available to the process. The method, system and computer program product of the invention uses predefined metrics to dynamically modify the degree to which local memory is used or favored during a mainstore page frame memory allocation.

Figure 1A:
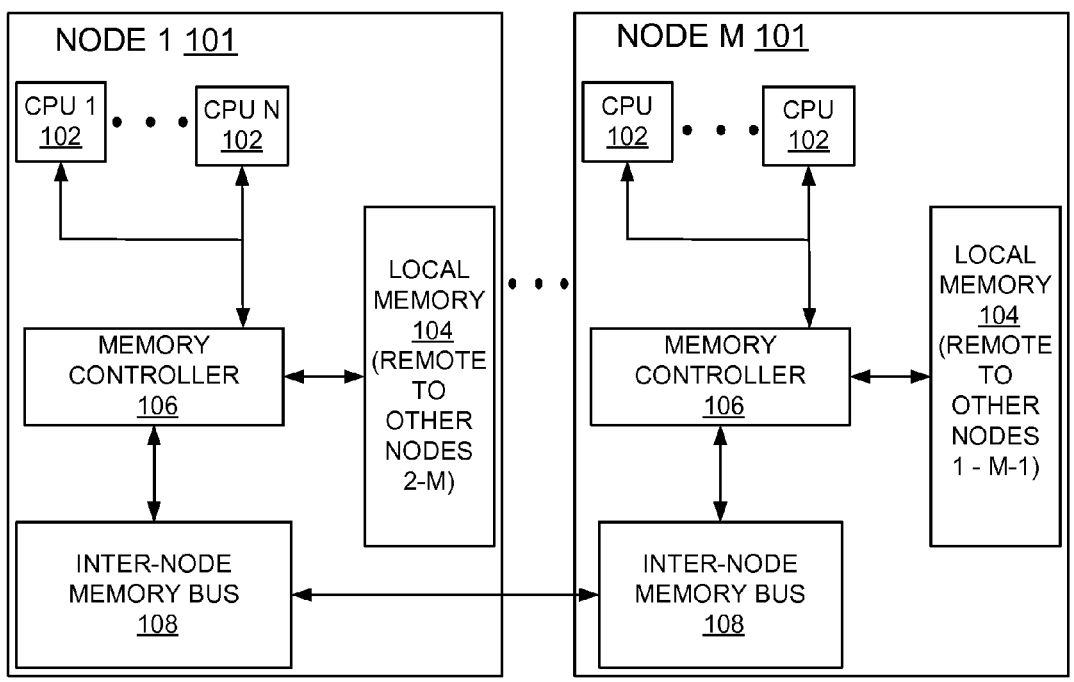
FIGS. 1A and 1B together provide a block diagram representation illustrating an example system for implementing feedback directed Non-Uniform Memory Access (NUMA) mitigation tuning in accordance with the preferred embodiment.
Figure 1B:
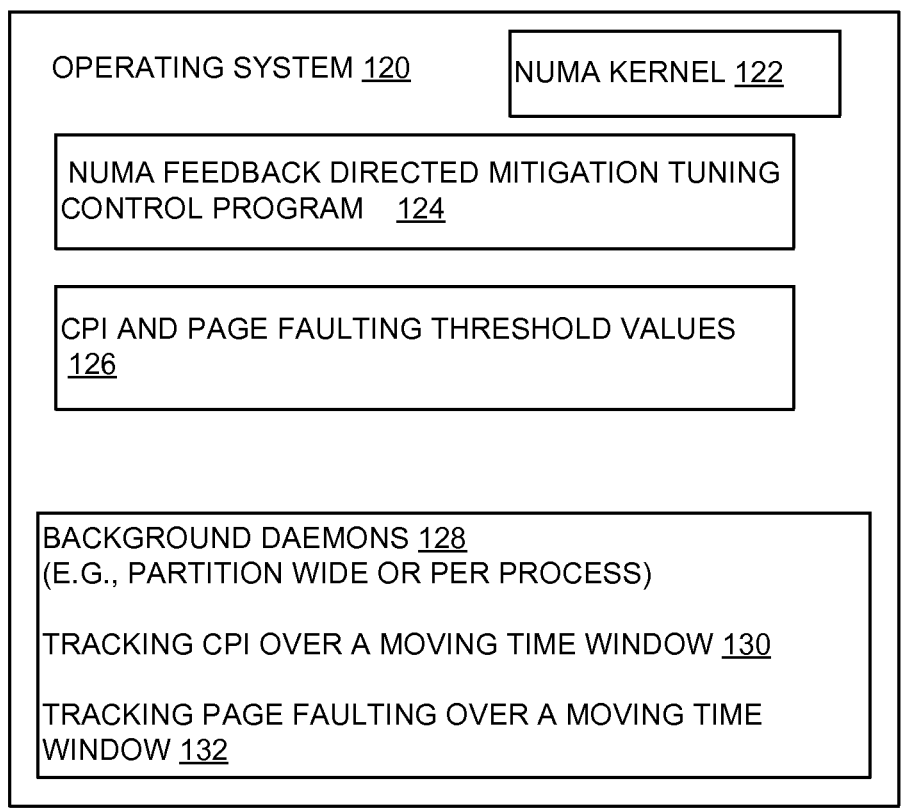

Having reference now to the drawings, in FIGS. 1A and 1B, there is shown an example computer system generally designated by the reference character 100 for implementing feedback directed Non-Uniform Memory Access (NUMA) mitigation tuning in accordance with the preferred embodiment.

Referring to FIG. 1A, computer system 100 is a NUMA system including a plurality of partitions or physical subsystem nodes 101, 1-M. Each subsystem node 101, 1-M includes a plurality of central processor units (CPUs) 102, 1-N coupled to a local memory 104 by a memory controller 106.

The local memory 104 includes, for example, cache and dynamic random access memory (DRAM) proximate to the CPUs 102. Each local memory 104 is local memory for its node 101, and remote memory to all other nodes, 101. For example, in subsystem node 101, 1, its local memory 104 is remote to all other nodes, 101, 2-M.

Each subsystem node 101, 1-M includes an inter-node memory bus 108 coupled to the memory controller 106 and to the inter-node memory bus 108, and memory controller 106 resident on other subsystem nodes 101, 1-M.

Referring also to FIG. 1B, computer system 100 includes an operating system 120 including a NUMA kernel 122, a NUMA feedback directed mitigation tuning control program 124 of the preferred embodiment, and a plurality of stored predefined performance metric threshold values 126, such as a cycles per instruction (CPI) threshold value 126 and a page faulting threshold value 126. The cycles per instruction (CPI) threshold value 126 and a page faulting threshold value 126 optionally include system administrator or user selected values. Computer system 100 includes a plurality of background daemons 128 that are provided on a partition wide or on a per process basis for monitoring the predefined performance metrics. The background daemons 128 are background computer programs including a background daemon 130 tracking cycles per instruction (CPI) over a moving time window, and a background daemon 132 tracking page faulting over a moving time window.

Computer system 100 is shown in simplified form sufficient for understanding the present invention. The illustrated computer system 100 is not intended to imply architectural or functional limitations. The present invention can be used with various hardware implementations and systems and various other internal hardware devices.

In accordance with features of the invention, ongoing performance metrics are continuously monitored by the background daemon 130 tracking cycles per instruction (CPI) over a moving time window, and the background daemon 132 tracking page faulting over a moving time window. The NUMA kernel 122 operates system 100 in a use or favor local memory mode for NUMA latency prevention.

In accordance with features of the invention, during a page frame memory allocation for a process, the predefined monitored performance metrics are compared with stored threshold values. Responsive to the compared values, selected use of local memory is dynamically modified during the page frame memory allocation.

Figure 2:
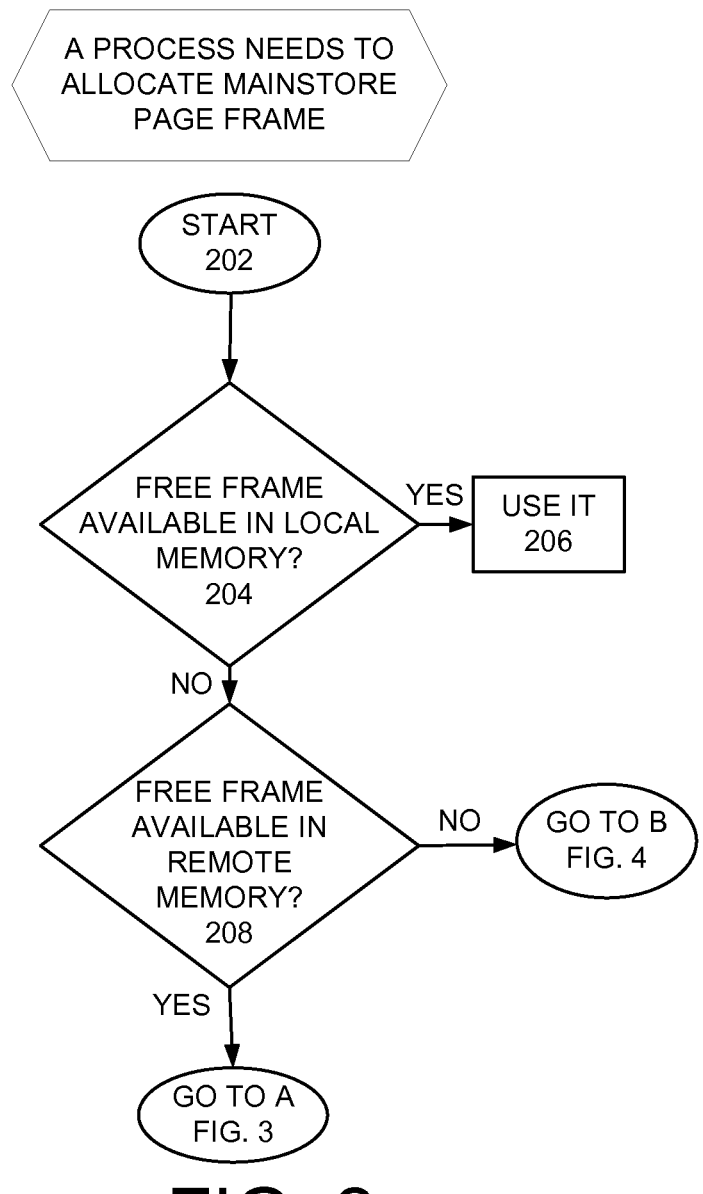
FIGS. 2, 3, and 4 together provide a flow chart illustrating exemplary operations for implementing feedback directed Non-Uniform Memory Access (NUMA) mitigation tuning in accordance with the preferred embodiment.
Figure 3:
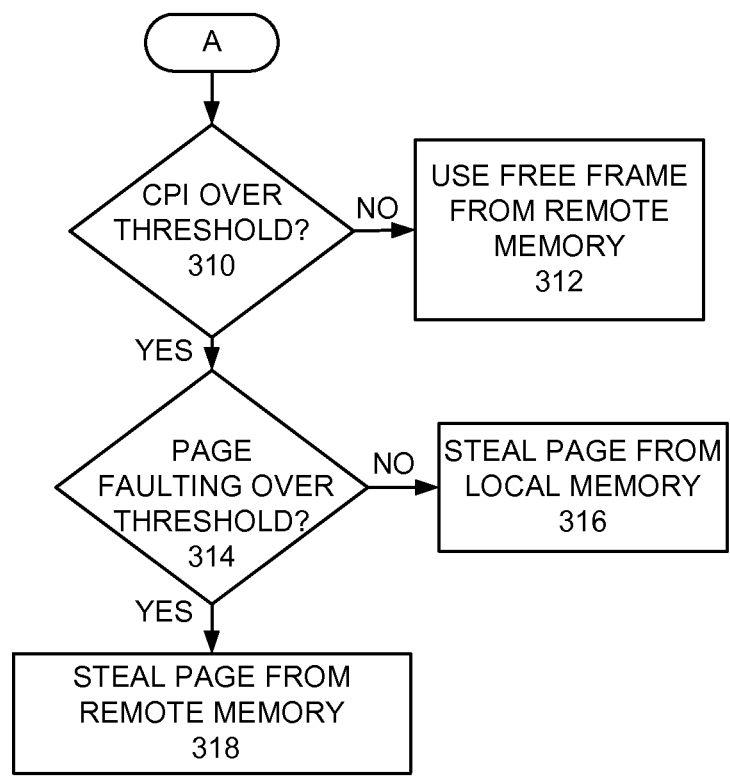
Figure 4:
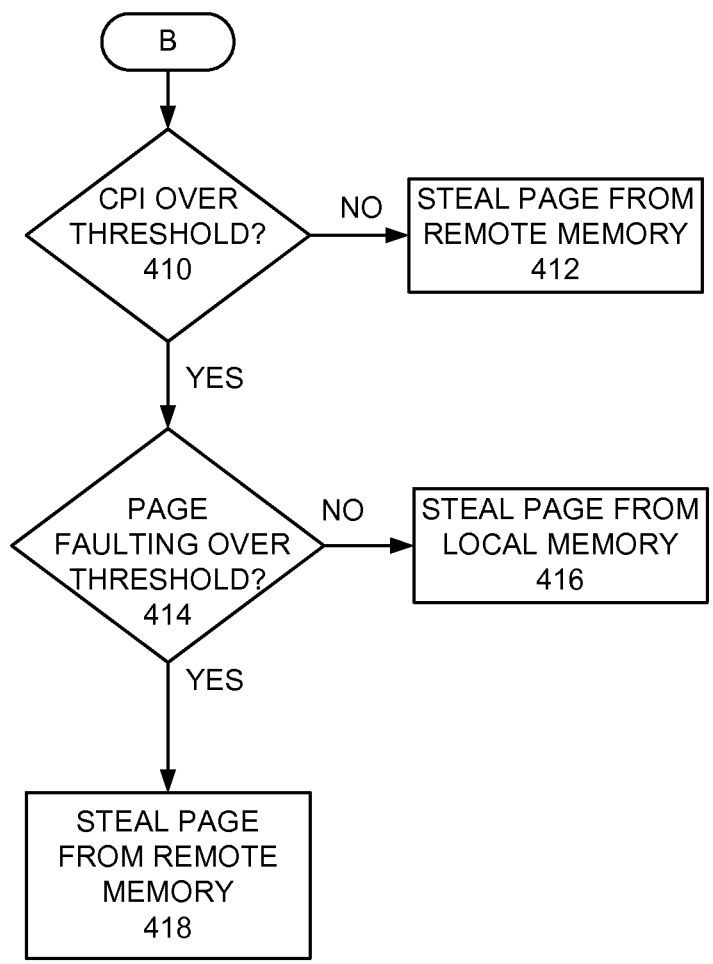

Referring to FIGS. 2, 3, and 4, there are shown exemplary operations for implementing feedback directed Non-Uniform Memory Access (NUMA) mitigation tuning in accordance with the preferred embodiment. The example NUMA mitigation tuning operations begin indicated at a block 202 and are performed during a page frame memory allocation for a process.

In FIG. 2, as indicated at a decision block 204 checking for a free frame being available in local memory is performed. When a free frame being available in local memory is identified, the free frame is used as indicated at a block 206. Otherwise when a free frame is not available in local memory, checking for a free frame being available in remote memory is performed as indicated at a decision block 208.

When a free frame being available in remote memory is identified at decision block 208, then operations continue following entry point A in FIG. 3. Otherwise when a free frame is not available in remote memory, then operations continue following entry point B in FIG. 4.

Referring now to FIG. 3, comparing the monitored ongoing CPI with the stored threshold value is performed as indicated at a decision block 310. Responsive to the monitored ongoing CPI being less than the stored CPI threshold value 126, the free frame in remote memory is used as indicated at a block 312.

Otherwise when monitored ongoing CPI is greater than the stored CPI threshold value 126, comparing the monitored ongoing page fault rate with the stored page fault threshold value is performed as indicated at a decision block 314. When the ongoing page fault rate is less than the stored page fault threshold value, a page is stolen from local memory as indicated at a block 316. When the ongoing page fault rate is greater than the stored page fault threshold value, a page is stolen from remote memory as indicated at a block 318.

Referring to FIG. 4, when a free frame is not available in remote memory, then comparing the monitored ongoing CPI with the stored threshold value is performed as indicated at a decision block 410. Responsive to the monitored ongoing CPI being less than the stored CPI threshold value 126, a page is stolen from remote memory as indicated at a block 412. Otherwise when monitored ongoing CPI is greater than the stored CPI threshold value 126, comparing the monitored ongoing page fault rate with the stored page fault threshold value is performed as indicated at a decision block 414. When the ongoing page fault rate is less than the stored page fault threshold value, a page is stolen from local memory as indicated at a block 416. When the ongoing page fault rate is greater than the stored page fault threshold value, a page is stolen from remote memory as indicated at a block 418.

Figure 5:
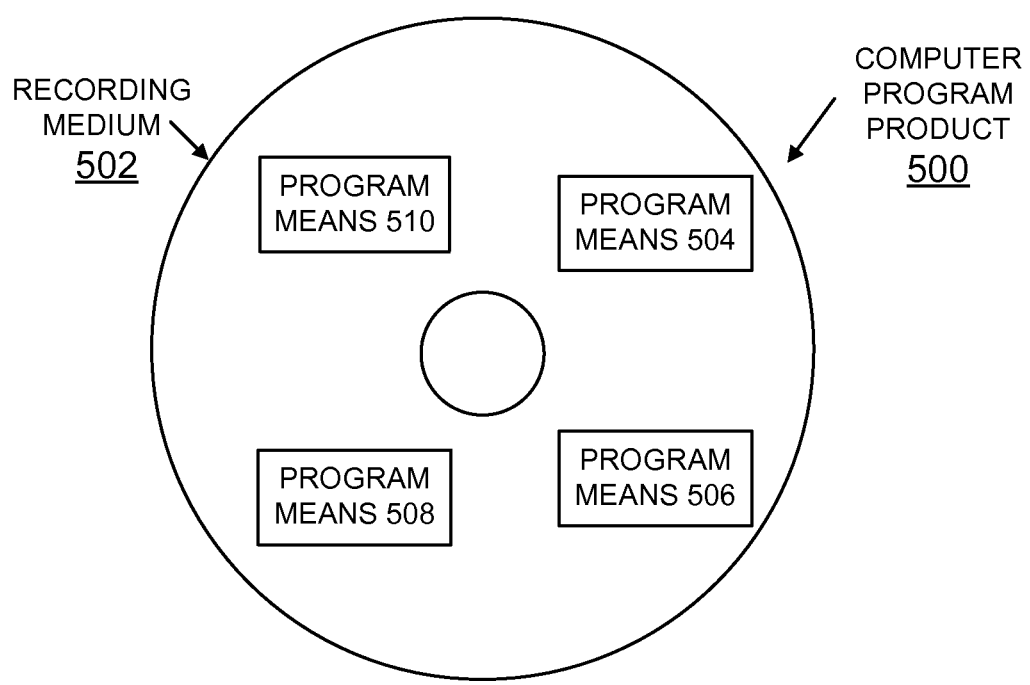
FIG. 5 is a block diagram illustrating a computer program product in accordance with the preferred embodiment.

Referring now to FIG. 5, an article of manufacture or a computer program product 500 of the invention is illustrated. The computer program product 500 is tangibly embodied on a non-transitory computer readable storage medium that includes a recording medium 502, such as, a floppy disk, a high capacity read only memory in the form of an optically read compact disk or CD-ROM, a tape, or another similar computer program product. Recording medium 502 stores program means 504, 506, 508, and 510 on the medium 502 for carrying out the methods for implementing feedback directed Non-Uniform Memory Access (NUMA) mitigation tuning of the preferred embodiment in the system 100 of FIGS. 1A and 1B.

A sequence of program instructions or a logical assembly of one or more interrelated nodes defined by the recorded program means 504, 506, 508, and 510, direct the computer system 100 for implementing feedback directed Non-Uniform Memory Access (NUMA) mitigation tuning of the preferred embodiment.

While the present invention has been described with reference to the details of the embodiments of the invention shown in the drawing, these details are not intended to limit the scope of the invention as claimed in the appended claims.

What is claimed is:

1. A method for implementing feedback directed Non-Uniform Memory Access (NUMA) mitigation tuning in a computer system comprising:
storing predefined performance metric threshold values;
monitoring predefined performance metrics;
performing a page frame memory allocation for a process by comparing said monitored predefined performance metrics with said stored predefined performance metric threshold values; and
dynamically modifying selected use of local memory for the page frame memory allocation responsive to the compared values including responsive to not identifying a free frame in local memory, and identifying a free frame being available in remote memory, comparing a monitored ongoing cycles per instruction (CPI) with a stored CPI threshold value; and using a free frame from remote memory responsive to the monitored ongoing CPI being less than the stored CPI threshold value; and responsive to the monitored ongoing CPI being greater than the stored CPI threshold value, comparing a monitored ongoing page fault rate with a stored page fault threshold value, and stealing a page from local memory or stealing a page from remote memory responsive to the compared page fault values.

2. The method as recited in claim 1 wherein storing predefined performance metric threshold values includes storing a cycles per instruction (CPI) threshold value.

3. The method as recited in claim 1 wherein storing predefined performance metric threshold values includes storing a page fault threshold value.

4. The method as recited in claim 1 wherein monitoring predefined performance metrics includes providing a background daemon for tracking cycles per instruction (CPI) over a moving time window.

5. The method as recited in claim 1 wherein monitoring predefined performance metrics includes providing a background daemon for tracking page faulting over a moving time window.

6. The method as recited in claim 1 wherein monitoring predefined performance metrics includes selectively monitoring predefined performance metrics for a process or a partition in the computer system.

7. The method as recited in claim 1 wherein dynamically modifying selected use of local memory for the page frame memory allocation responsive to the compared values includes identifying a free frame in local memory and using the identified free frame in local memory.

8. A method for implementing feedback directed Non-Uniform Memory Access (NUMA) mitigation tuning in a computer system comprising:
storing predefined performance metric threshold values;
monitoring predefined performance metrics;
performing a page frame memory allocation for a process by comparing said monitored predefined performance metrics with said stored monitoring predefined performance metric threshold values; and
dynamically modifying selected use of local memory for the page frame memory allocation responsive to the compared values including responsive to not identifying a free frame in local memory, and not identifying a free frame being available in remote memory, comparing a monitored ongoing cycles per instruction (CPI) with a stored CPI threshold value; and stealing a page from remote memory responsive to the monitored ongoing CPI being less than the stored CPI threshold value; and responsive to the monitored ongoing CPI being greater than the stored CPI threshold value, comparing a monitored ongoing page fault rate with a stored page fault threshold value, and stealing a page from local memory or stealing a page from remote memory responsive to the compared page fault values.

9. A system for implementing feedback directed Non-Uniform Memory Access (NUMA) mitigation tuning in a computer system comprising:
a local memory;
a remote memory
a central processor unit (CPU) coupled to said local memory and said remote memory;
a NUMA feedback directed mitigation tuning control computer program product tangibly embodied on a non-transitory computer readable storage medium,
said NUMA feedback directed mitigation tuning control computer program product performing a page frame memory allocation for a process by comparing monitored ongoing predefined performance metrics with stored predefined performance metric threshold values; and dynamically modifying selected use of local memory for the page frame memory allocation responsive to the compared values including responsive to not identifying a free frame in local memory, and identifying a free frame being available in remote memory, comparing a monitored ongoing cycles per instruction (CPI) with a stored CPI threshold value; and using a free frame from remote memory responsive to the monitored ongoing CPI being less than the stored CPI threshold value; and responsive to the monitored ongoing CPI being greater than the stored CPI threshold value, comparing a monitored ongoing page fault rate with a stored page fault threshold value, and stealing a page from local memory or stealing a page from remote memory responsive to the compared page fault values.

10. The system as recited in claim 9 includes a background daemon for monitoring predefined performance metrics including tracking cycles per instruction (CPI) over a moving time window.

11. The system as recited in claim 9 includes a background daemon for monitoring predefined performance metrics including tracking page faulting over a moving time window.

12. The system as recited in claim 9 includes a background daemon selectively monitoring predefined performance metrics for a process or a partition in the computer system.

13. The system as recited in claim 9 wherein said stored predefined performance metric threshold values includes a cycles per instruction (CPI) threshold value; and a page fault threshold value.

14. A computer program product for implementing feedback directed Non-Uniform Memory Access (NUMA) mitigation tuning in a computer system, said computer program product tangibly embodied in a non-transitory machine readable medium, said computer program product including instructions executed by the computer system to cause the computer system to perform the steps comprising:

storing predefined performance metric threshold values;
monitoring predefined performance metrics;
performing a page frame memory allocation for a process by comparing said monitored predefined performance metrics with said stored predefined performance metric threshold values; and
dynamically modifying selected use of local memory for the page frame memory allocation responsive to the compared values including responsive to not identifying a free frame in local memory, and identifying a free frame being available in remote memory, comparing a monitored ongoing cycles per instruction (CPI) with a stored CPI threshold value; and using a free frame from remote memory responsive to the monitored ongoing CPI being less than the stored CPI threshold value; and responsive to the monitored ongoing CPI being greater than the stored CPI threshold value, comparing a monitored ongoing page fault rate with a stored page fault threshold value, and stealing a page from local memory or stealing a page from remote memory responsive to the compared page fault values.

15. The computer program product as recited in claim 14 wherein storing predefined performance metric threshold values includes storing a cycles per instruction (CPI) threshold value.

16. The computer program product as recited in claim 14 wherein storing predefined performance metric threshold values includes storing a page fault threshold value.

17. The computer program product as recited in claim 14 wherein monitoring predefined performance metrics includes providing a background daemon for tracking cycles per instruction (CPI) over a moving time window.

18. The computer program product as recited in claim 14 wherein monitoring predefined performance metrics includes providing a background daemon for tracking page fault rate over a moving time window.

19. The computer program product as recited in claim 14 wherein monitoring predefined performance metrics includes selectively monitoring predefined performance metrics for a process or for a partition in the computer system.

* * * * *